(12) United States Patent
Salminen

(10) Patent No.: US 11,874,876 B2
(45) Date of Patent: Jan. 16, 2024

(54) ELECTRONIC DEVICE AND METHOD FOR PREDICTING AN INTENTION OF A USER

(71) Applicant: HUAWEI TECHNOLOGIES CO., LTD., Shenzhen (CN)

(72) Inventor: Karoliina Taru Katriina Salminen, Helsinki (FI)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 745 days.

(21) Appl. No.: 17/008,283

(22) Filed: Aug. 31, 2020

(65) Prior Publication Data

US 2020/0394228 A1   Dec. 17, 2020

Related U.S. Application Data

(63) Continuation of application No. PCT/EP2018/079874, filed on Oct. 31, 2018.

(51) Int. Cl.
| | |
|---|---|
| *G10L 15/22* | (2006.01) |
| *G06F 16/9032* | (2019.01) |
| *G06F 16/909* | (2019.01) |
| *G06F 16/9035* | (2019.01) |

(52) U.S. Cl.
CPC ...... *G06F 16/90332* (2019.01); *G06F 16/909* (2019.01); *G06F 16/9035* (2019.01)

(58) Field of Classification Search
CPC ......... G10L 15/22; G10L 15/08; G10L 15/10; G10L 15/16; G10L 15/18; G10L 15/183; G10L 15/26; G10L 2015/0631–0638; G10L 2015/221–228; G06F 40/35;

(Continued)

(56) References Cited

U.S. PATENT DOCUMENTS

| | | |
|---|---|---|
| 7,778,632 B2 | 8/2010 | Kurlander et al. |
| 2007/0099602 A1 | 5/2007 | Kurlander et al. |

(Continued)

FOREIGN PATENT DOCUMENTS

| | | |
|---|---|---|
| CN | 103390194 A | 11/2013 |
| CN | 108153780 A | 6/2018 |
| EP | 3107317 B1 | 11/2018 |

OTHER PUBLICATIONS

IEEE Std 802.11-2016(Revision of IEEE Std 802.11-2012),Part 11: Wireless LAN Medium Access Control (MAC) and Physical Layer (PHY) Specifications,IEEE Computer Society,Sponsored by the LAN/MAN Standards Committee,total 3534 pages.

(Continued)

*Primary Examiner* — Qi Han
(74) *Attorney, Agent, or Firm* — HAUPTMAN HAM, LLP

(57) ABSTRACT

An electronic device for predicting an intention of a user is configured to provide a question to the user and predict at least one first intention of the user based on context information associated with the user. The device is also configured to determine a question based on the at least one first intention of the user. The device is further configured to provide the question to the user. The device is additionally configured to receive a response to the question from the user. The device is also configured to predict at least one second intention of the user based on the at least one first intention of the user and the response to the question from the user.

20 Claims, 7 Drawing Sheets

(58) Field of Classification Search
CPC .......... G06F 40/10; G06F 40/20; G06F 40/30; G06F 40/40; G06F 40/56
USPC .... 704/270.1, 275, 270, 257, 231, 238, 250, 704/258, 9
See application file for complete search history.

(56) References Cited

U.S. PATENT DOCUMENTS

| | | | |
|---|---|---|---|
| 2014/0278413 A1* | 9/2014 | Pitschel | G10L 15/22 704/243 |
| 2015/0162000 A1 | 6/2015 | Di Censo et al. | |
| 2018/0181573 A1 | 6/2018 | Zhao | |
| 2018/0342005 A1* | 11/2018 | Yuhara | H04W 4/48 |

OTHER PUBLICATIONS

Patrick Hertzog et al, "Context-aware mobile assistants for optimal interaction", IUI 04, Jan. 13-16, 2004, Madeira, Funchal, Portugal: ACM Press, US, p. 256-258, XP058178213, total 3 pages.

Aj2265 et al, "Random indexing", Oct. 16, 2018 (Oct. 16, 2018), p. 1-2, Retrieved from the Internet: URL:https://en.wikipedia.org/w/index.php?title=Random_indexingandoldid=864347204 XP055566069, total 2 pages.

International search report dated Mar. 18, 2019 from corresponding application No. PCT/EP2018/079874.

Chinese Office Action issued in corresponding Chinese Application No. 201880097284.7, dated Aug. 26, 2023, pp. 1-8.

* cited by examiner

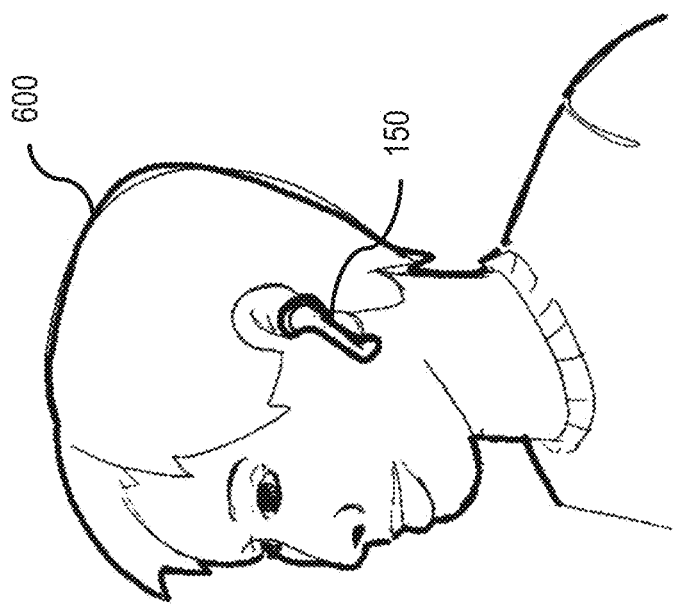
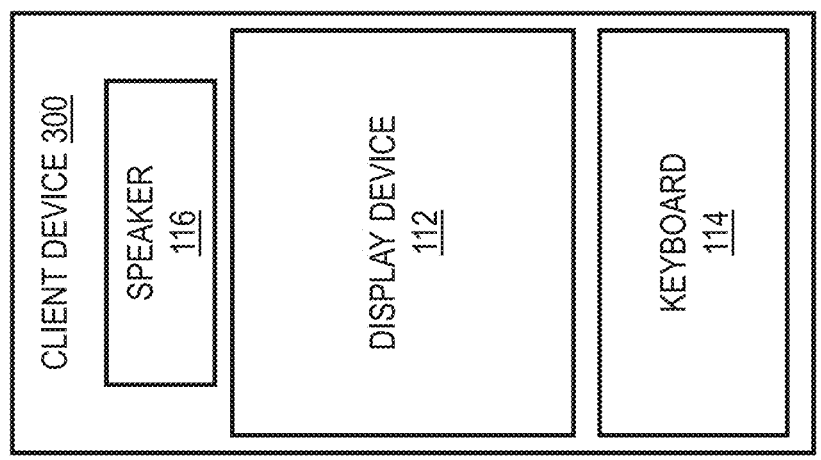
FIG. 4

ELECTRONIC DEVICE AND METHOD FOR PREDICTING AN INTENTION OF A USER

CROSS-REFERENCE TO RELATED APPLICATIONS

This application is a continuation of International Application No. PCT/EP2018/079874, filed on Oct. 31, 2018. The disclosure of the aforementioned application is hereby incorporated by reference in its entirety.

TECHNICAL FIELD

The present disclosure relates to an electronic device and a corresponding method for predicting an intention of a user. Furthermore, the present disclosure also relates to a computer program.

BACKGROUND

So called virtual assistants are known in the art and are available from multiple vendors. Examples of virtual assistants are Google's Google Assistant, Apple's Siri, Amazon's Alexa and Microsoft's Cortana. A virtual assistant can be considered as a software agent that can perform different tasks and services for a user, i.e. an individual or a person using the virtual assistant. Normally, the virtual assistant is installed as a software in an electronic device. Obvious non-limiting examples of electronic devices in this respect are smartphones and personal computers.

Typical user interfaces employed by the user when interacting with the virtual assistant are microphones, touch screen displays and dedicated physical buttons. Examples of services provided by virtual assistants are presenting information, play music, play videos, controlling chat functions, read emails, etc. The types of tasks and services provided by virtual assistants is constantly increasing.

The conventional virtual assistant receives commands from the user and acts accordingly. For example, the user commands "play music" and the virtual assistant starts a music player. The user commands "play movie" and the virtual assistant starts a video player. The user may also query the virtual assistant by asking a question.

SUMMARY

An objective of embodiments of this disclosure is to provide a solution which mitigates or solves the drawbacks and problems of conventional solutions.

The above and further objectives are solved by the subject matter of the independent claims. Further advantageous embodiments can be found in the dependent claims.

According to a first aspect, the above mentioned and other objectives are achieved with an electronic device configured to predict at least one first intention of the user based on context information associated with the user; determine a question based on the first intention of the user; provide the question to the user; receive a response to the question from the user; and predict at least one second intention of the user based on the first intention of the user and the response to the question from the user.

A user can in this disclosure be understood to mean an individual or a person using the electronic device directly or indirectly, e.g. by means of a virtual assistant or any other suitable software application configured to execute embodiments. More specifically, the user may be the individual or person providing the response to the question determined by the electronic device.

Context information herein can be any information associated with the user and obtainable by the electronic device. Non-limiting examples of context information is information related to time, location, sensor information (such as from accelerators, gyros, barometers, proximity, etc.), and activity (such as walking, running, driving, going with a bus, talking, reading, etc.). The context information can be obtained directly by the electronic device itself or provided to the electronic device. For example, context information could be pushed by the Cloud to the electronic device.

An advantage of the electronic device according to the first aspect is that the predicted intention of the user is improved compared to predicted intentions produced by conventional solutions. By providing a question to the user and receiving the response to the question from the user the context of the user can be improved. With improved context also the predicted intention of the user, denoted the second intention herein, can be improved. By knowing the intention of the user e.g. relevant suggested information and/or relevant suggested actions can be provided and presented to the user. Furthermore, since the electronic device initiates the interaction with the user by providing the question the user does not need to actively act to initiate the interaction with the electronic device, such as pressing a button or speak in a microphone.

Hence, one exemplary implementation of the electronic device is to implement a virtual assistant. Other non-limiting applications are driver assistance for vehicles and control systems for controlling other devices and machines.

It is to be further noted that the electronic device according to the first aspect can be configured to iteratively implement the question/response algorithm between the electronic device and the user herein proposed. In such a case one or more second intentions can be predicted, and a second question is determined based on the one or more predicted second intentions. The second question is provided to the user and a second response to the second question is received and processed by the electronic device so as to predict one or more third intentions. This iterative algorithm can be executed until a correct intention of the user is predicted.

In an implementation form of an electronic device according to the first aspect, the electronic device is further configured to determine a suggested action based on the second intention of the user; and provide the suggested action to the user.

This implementation form implies that a suggested action, determined based on the second intention, is provided to the user.

An advantage with this implementation form is that relevant actions are provided to the user conditioned that the second intention is correct. Hence, the user does not need to perform an action for being provided with the suggested action.

In an implementation form of an electronic device according to the first aspect, the electronic device is further configured to determine suggested information based on the second intention of the user; and provide the suggested information to the user.

This implementation form implies that a suggested information, determined based on the second intention, is provided to the user. Hence, the user does not need to perform an action for being provided with the suggested information.

An advantage with this implementation form is that relevant information is presented to the user conditioned that the second intention is correct.

In an implementation form of an electronic device according to the first aspect, the electronic device is further configured to predict a single first intention of the user based on context information associated with the user; predict the second intention of the user to be equal to the single first intention of the user.

An advantage with this implementation form is that the first intention is correct.

In an implementation form of an electronic device according to the first aspect, the electronic device is further configured to predict a plurality of first intentions of the user based on context information associated with the user; predict the second intention of the user to be equal to a single first intention of the user among the plurality of first intentions of the user.

An advantage with this implementation form is that the second intention is limited to the set of first intentions.

In an implementation form of an electronic device according to the first aspect, the question as a closed-end question.

An advantage with this implementation form is that the question in this form is simple to understand by the user. Further, the response to the question is also simple since only an affirmative or negative response to the question is enough for the user to communication to the electronic device. Hence, the usability is substantially improved compared to conventional solutions.

In an implementation form of an electronic device according to the first aspect, the response to the closed-end question is affirmative or negative.

The affirmative or negative response can be expressed in a number of different ways. In one non-limiting example the affirmative or negative response is represented with a voice speech having the semantic meaning of Yes or No. The affirmative or negative response can also be represented with a movement of the user, e.g. a nod of a head of the user is interpreted as an affirmative and a shake of the head as a negative. The affirmative or negative response can also be expressed as touch of a yes-button or a no-button, respectively.

An advantage with this implementation form is that the response of the user is very simple for the user to provide. Further, the response of the user to the question can be held very discreet which, e.g. is advantage in a public environment, when the user wants to be discrete. Also, the processing in the electronic device can be held simple since the electronic device only has to recognize if the response to the question is affirmative or negative response.

In an implementation form of an electronic device according to the first aspect, predict at least one first intention of the user based on the context information associated with the user comprises combine a plurality of sparse vectors corresponding to a plurality of context information associated with the user so as to obtain a combined sparse vector; predict the first intention based on random indexing of the combined sparse vector.

An advantage with this implementation form is that a convenient solution for predicting the first intention is provided. This solution is also simple to implement and results in low power consumption.

In an implementation form of an electronic device according to the first aspect, the context information associated with the user comprises temporal context information and spatial context information.

An advantage with this implementation form is that both temporal context information and spatial context information is considered to correctly determine the context of the user so as to obtain improved predictions of intentions of the user. Further, using both spatial and temporal context information has the advantage of predicting repeating pattern of tasks, e.g. every day at the same time at the same place performing a particular task, and predicting tasks with associated subtasks which form sequences of tasks, e.g. first perform task 1, then perform task 2, then perform task 3, and so on. Some tasks are completely independent of the place or time (i.e. spatial context) but dependent on which task that was performed previously.

In an implementation form of an electronic device according to the first aspect, determine the question based on the first intention of the user comprises selecting the question among a plurality of pre-defined questions in dependence on the first intention of the user.

An advantage with this implementation form is that by using pre-defined questions, the selection can be performed fast. Further, not using pre-defined questions would require very complex AI technologies that do not exist at the moment.

In an implementation form of an electronic device according to the first aspect, providing the question to the user comprises output the question to the user using an output user interface.

A number of different output user interfaces can be used in conjunction with embodiments. Non-limiting examples are speakers, displays, and tactile means. In the case speech is used a speech synthesizer can be used to produce the question in the form of speech to the user.

In an implementation form of an electronic device according to the first aspect, receive the response to the question from the user comprises detect an input of the user using an input user interface; translate the input of the user into the response to the question.

A number of different input user interfaces can be used in conjunction with embodiments. Non-limiting examples are microphones, cameras, displays, and tactile means. In the case speech is used, speech recognition can be done by a speech recognition engine.

In an implementation form of an electronic device according to the first aspect, the first intention of the user and the second intention of the user is an action of the user or a need of the user.

According to a second aspect, the above mentioned and other objectives are achieved with a method for an electronic device, the method comprises predicting at least one first intention of the user based on context information associated with the user; determining a question based on the first intention of the user; providing the question to the user; receiving a response to the question from the user; and predicting at least one second intention of the user based on the first intention of the user and the response to the question from the user.

The method according to the second aspect can be extended into implementation forms corresponding to the implementation forms of the electronic device according to the first aspect. Hence, an implementation form of the method comprises the feature(s) of the corresponding implementation form of the electronic device.

The advantages of the methods according to the second aspect are the same as those for the corresponding implementation forms of the electronic device according to the first aspect.

Another aspect relates to a computer program, characterized in program code, which when run by at least one processor causes said at least one processor to execute any method according to embodiments of the invention. Another aspect relates to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Further applications and advantages of the embodiments will be apparent from the following detailed description.

BRIEF DESCRIPTION OF THE DRAWINGS

The appended drawings are intended to clarify and explain different embodiments, in which:

FIG. 4 shows another exemplary application of an electronic device according to an embodiment;

DETAILED DESCRIPTION

Figure 1:
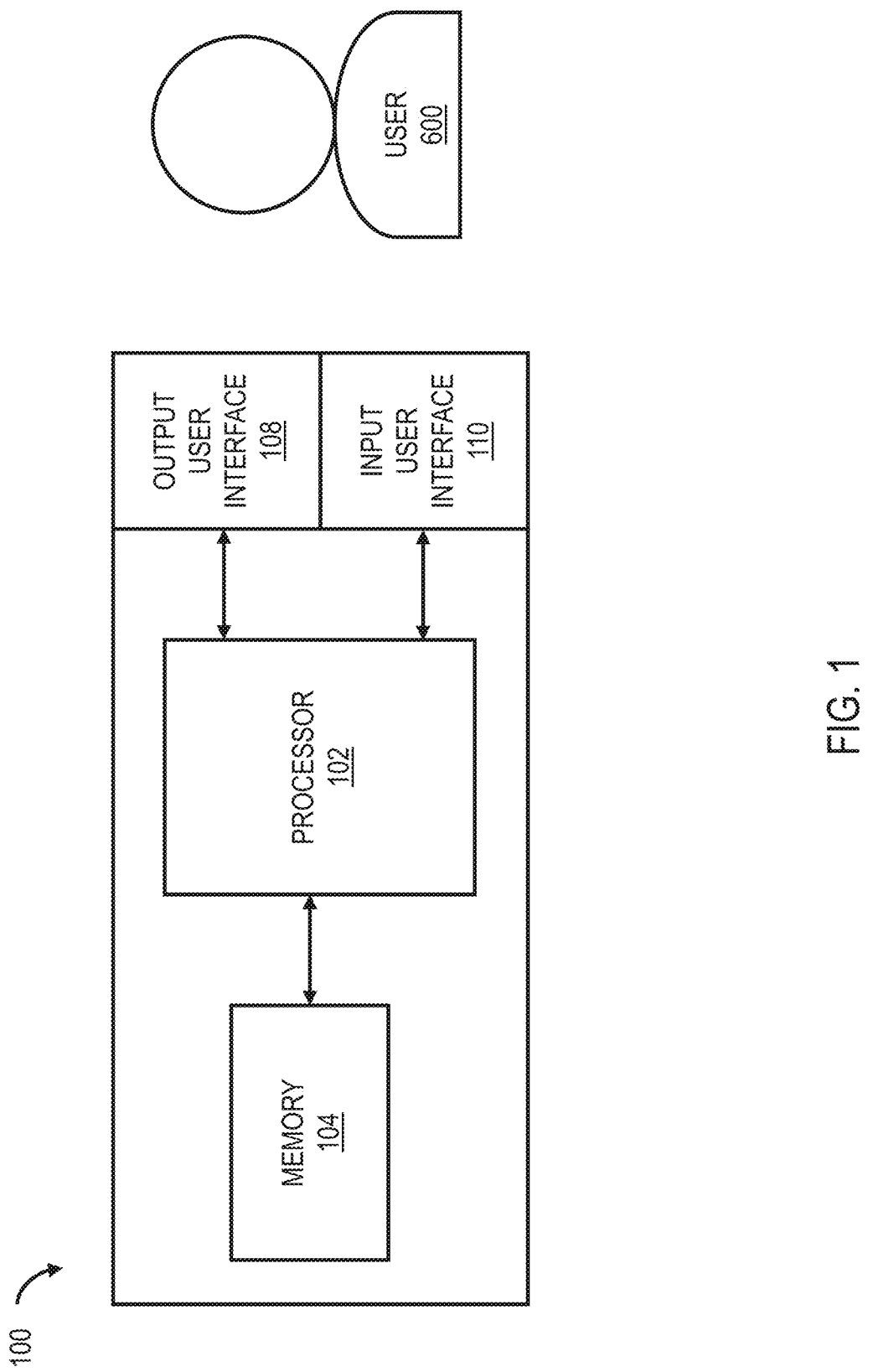
FIG. 1 shows an electronic device according to an embodiment.

To improve the function of conventional virtual assistants it has been realized that to predict an intention of the user so as to provide correct information or to perform correct actions according to the intention of the user. One meaning of correct information or correct action herein can be understood that the information presented or the action performed matches the intention of the user.

It is a drawback of conventional virtual assistants that predictions do not match the intention of the user. This is due to the fact that user behavior is partly random and hard to predict. For example, a prediction for a bus time table may be correct when the user is approaching a bus stop, but the intention of the user may not be to travel with the bus. The user might instead be waiting at the bus stop to be picked up by a car.

Generally, conventional virtual assistants do not understand context information associated with the user correctly and therefore do not have correct knowledge of the intention of the user. In other words, conventional virtual assistants do not understand the intention of the user, but merely rely on what the user says without understanding or predicting what the user is going to potentially do next or what the needs of the user could be next.

Therefore, to address the drawbacks of existing conventional solutions, and to augment the context of the user, an accurate prediction of an intention of the user based on feedback from the user is needed. Thereby, improved context of the user results in improved predictions. Conventional virtual assistants on the other hand are passive in the respect that they do not start conversations with the user, and the user is not eager to start the conversations with the virtual assistant even though the user actually would need the help of the virtual assistant.

Therefore, one or more embodiments relate to an electronic device and a corresponding method which are able to provide a question to the user so as to initiate an interaction with the user. After providing the question to the user a response to the question is received from the user and the response can be used to augment the prediction of the intention of the user. Examples of such embodiments are shown in FIGS. 1 and 2 and described in the following disclosure.

One application or implementation of improved predictions of a user, according to some embodiments, is in virtual assistant applications. By having correct or improved predictions the virtual assistant can provide and/or perform correct information and actions. However, applications of the predicted intentions of the user herein disclosed are not limited thereto and predictions of the intention of the user can be used and implemented in all systems and devices which need or can be improved by such predictions as input in its processing. Non-limiting examples of such systems and devices are vehicle driver assistance in car and trucks, and in control systems for controlling cranes and associated tools, such as rotators and tilt rotators.

Figure 2:
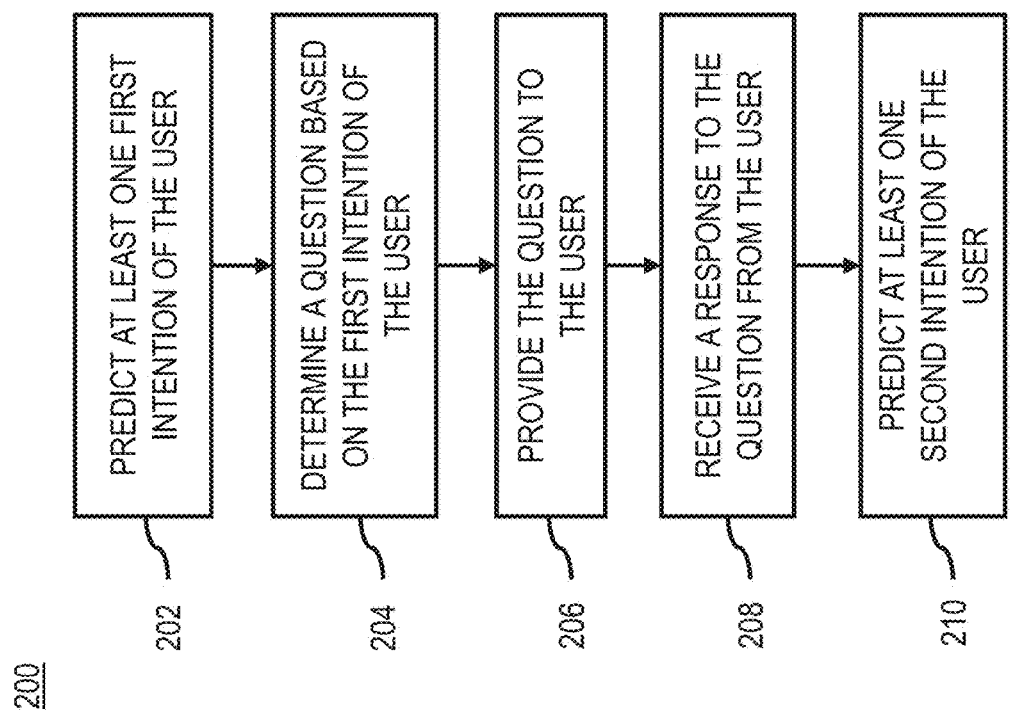
FIG. 2 shows a flow chart of a method for an electronic device according to an embodiment.

FIG. 1 shows an electronic device 100 according to an embodiment. In the embodiment shown in FIG. 1, the electronic device 100 comprises a processor 102, a memory 104, an output user interface 108 and an input user interface 110. The processor 102 is coupled to the memory 104, the output user interface 108 and the input user interface 110 by communication means known in the art. The output user interface 108 is configured to output information/data to the user 600 whilst the input user interface 110 is configured to receive input from the user 600. That the electronic device 100 is configured to perform certain actions can in this disclosure be understood to mean that the electronic device 100 comprises suitable means, such as e.g. the processor 102 and the memory 104, configured to perform said actions.

According to embodiments, the electronic device 100 is configured to predict at least one first intention of the user 600 based on context information associated with the user 600. The electronic device 100 is configured to determine a question based on the first intention of the user 600 and to provide the question to the user 600. The electronic device 100 is further configured to receive a response to the question from the user 600; and to predict at least one second intention of the user 600 based on the first intention of the user 600 and the response to the question from the user 600.

FIG. 2 shows a flow chart of a corresponding method 200 which may be executed in an electronic device 100, such as the one shown in FIG. 1. The method 200 comprises predicting 202 at least one first intention of the user 600 based on context information associated with the user 600. The method 200 comprises determining 204 a question based on the first intention of the user 600. The method 200 comprises providing 206 the question to the user 600. The method 200 comprises receiving 208 a response to the question from the user 600. The method 200 comprises predicting 210 at least one second intention of the user 600 based on the first intention of the user 600 and the response to the question from the user 600.

According to embodiments the first intention of the user 600 and the second intention of the user 600 is an action of the user 600 or a need of the user 600. By knowing the action or the need of the user 600 the electronic device 100 can provide relevant information and/or perform relevant tasks.

Figure 3:
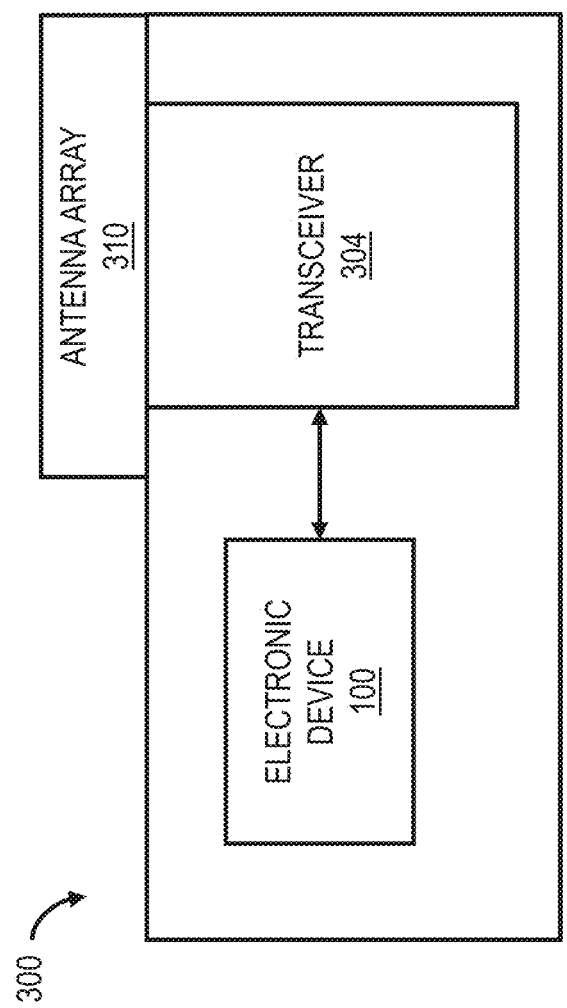
FIG. 3 shows an exemplary application of an electronic device according to an embodiment.

The electronic device 100 herein can be a standalone device or part of another device. FIG. 3 shows an example in which a client device 300 comprises an electronic device 100 according to embodiments. The client device 300 in this exemplary embodiment further comprises a transceiver 304 coupled to the electronic device 100 through communication means 308. The transceiver is also coupled to an antenna or an antenna array 310 which means that the client device 300 is configured for wireless communications. The client device 300 can e.g. be a so-called mobile device or a user equipment (UE) in 3GPP systems, such as long term evolution (LTE) and new radio (NR).

FIG. 4 illustrates a non-limiting example of a client device 300 in the form of a mobile device. The mobile device houses at least one processor, at least one display device 112, and at least one communication means. The mobile device further comprises input means e.g. in the form of a keyboard 114 communicatively connected to the display device 112. The mobile device further comprises output means e.g. in the form of a speaker 116. The mobile device may be a mobile phone, a tablet PC, a mobile PC, a smart phone, a standalone mobile device, or any other suitable communication device. It is also shown in FIG. 4 that the mobile device is communicably coupled to a headset 150 which comprises output means (e.g., a speaker) and input means (e.g., a microphone) for interaction between the electronic device 100 and the user 600.

In an embodiment, the electronic device 100 has access to everything the user 600 performs on the mobile device and can use this information for predicting the intentions of the user 600. Hence, said information can make part of the context information associated with the user 600.

Figure 5:
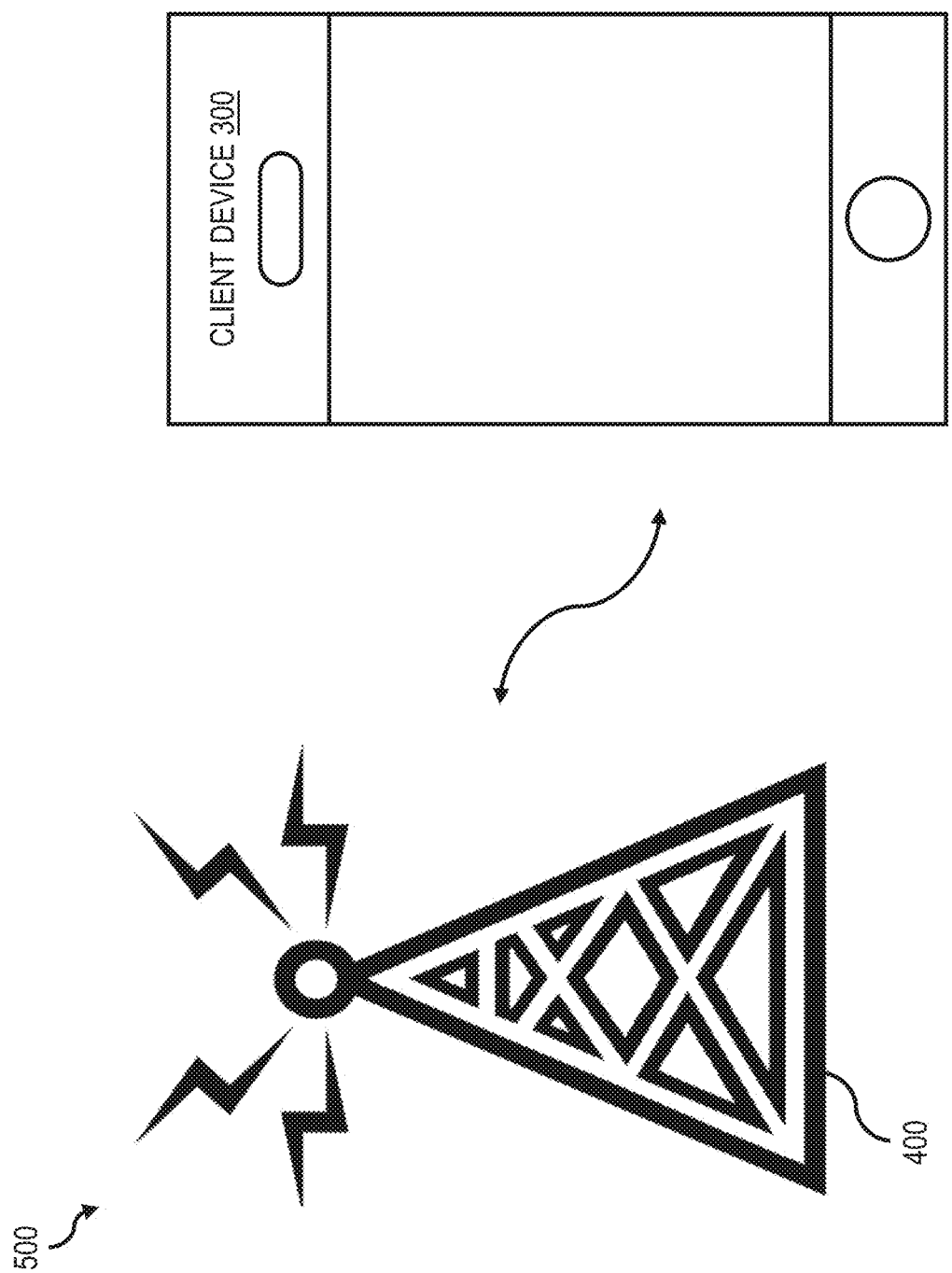
FIG. 5 illustrates a wireless communication system.

Furthermore, FIG. 5 illustrates a wireless communication system 500 comprising a client device 300 and a network access node 400 configured to operate in the wireless communication system 500. For simplicity, the wireless communication system 500 shown in FIG. 5 only comprises one client device 300 and one network access node 400. However, the wireless communication system 500 may comprise any number of client device 300 and any number of network access nodes 400 without deviating from the scope. In the wireless communication system 500, the client device 300 and the network access node 400 are configured to interact with each other according to any suitable communication standard, such as LTE and 5G NR.

Figure 6:
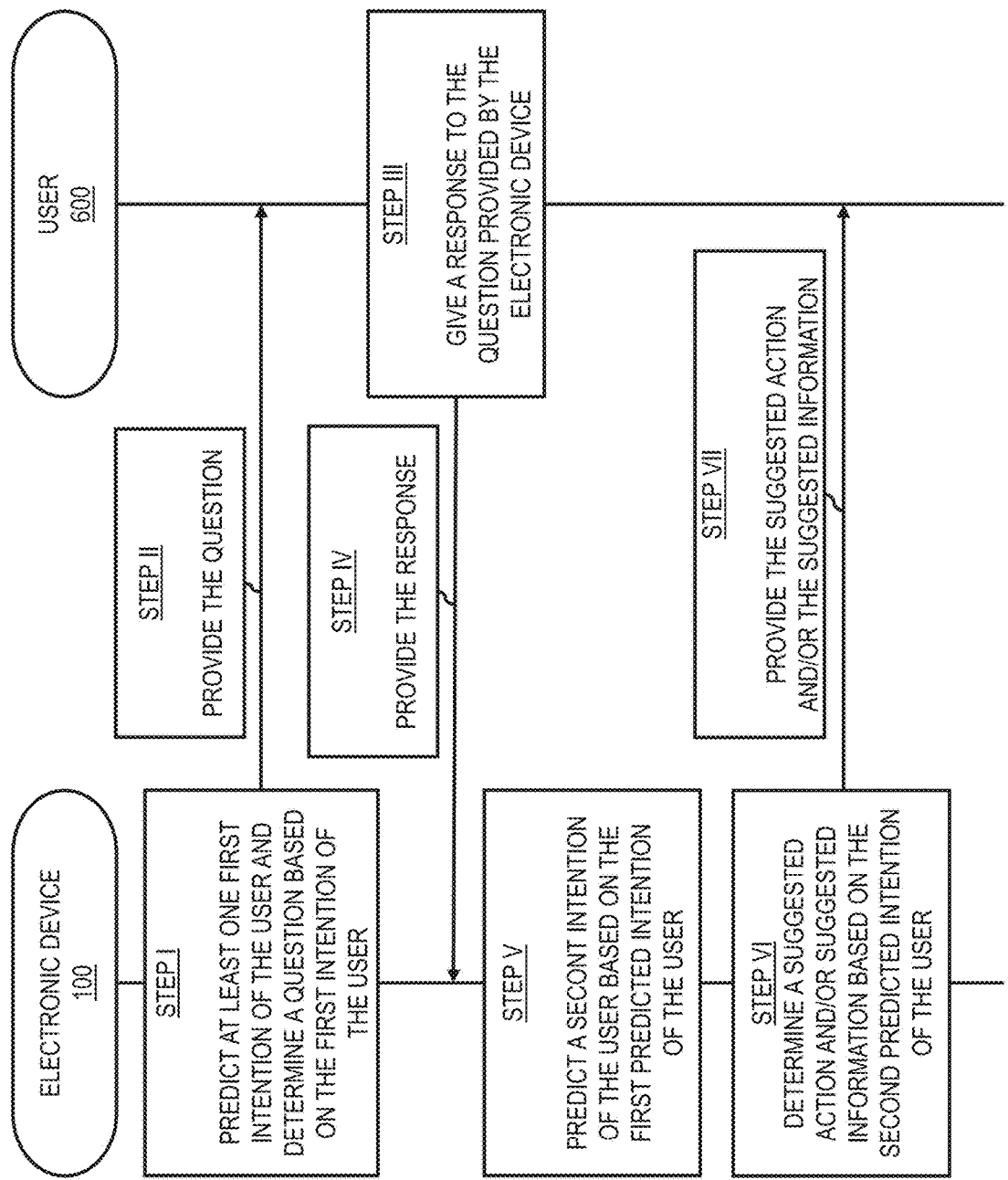
FIG. 6 a signalling diagram illustrates the interaction between an electronic device according to an embodiment and a user of the electronic device.

Moreover, FIG. 6 shows a diagram of interaction between an electronic device 100 and a user 600 of the electronic device 100 according to embodiments.

At step I in FIG. 6, the electronic device 100 predicts at least one first intention of the user 600 based on context information associated with the user 600. This can be performed in a number of different ways. In one embodiment predicting the first intention involves combining a plurality of sparse vectors corresponding to a plurality of context information associated with the user 600 so as to obtain a combined sparse vector. The first intention is thereafter predicted based on random indexing of the combined sparse vector obtained previously. The context information associated with the user 600 comprises according to an embodiment at least temporal context information and spatial context information. Further context information can however be used for predicting the intention of the user 600. Context information can be derived from sensors, GPS, accelerometers, cameras, microphones, etc. More details of how the first intention is predicted and the content of the context information will be described in the following disclosure.

Further, at step I in FIG. 6, the electronic device 100 also determines a question based on one or more predicted first intentions of the user 600. The question can be determined by selecting the question among a plurality of pre-defined questions in dependence on the first intention of the user 600. Hence, the electronic device 100 may have a pre-defined and pre-trained set of intentions which may be stored in a memory of the electronic device 100.

According to an embodiment, the question generated by the electronic device 100 is a closed-end question. Contrary to so called open questions the response or answer to a closed-end question is limited to Yes or No. In other words, the response is affirmative or negative only. Examples of question generated in dependence on the first intention of the user 600 is given below:

First intention: the user 600 is lost—corresponding question Q: are you lost?

First intention: the user 600 is going to the bus stop—corresponding question Q: are you going to the bus stop?

First intention: the user 600 is going home—corresponding question Q: are you going home?

First intention: the user 600 is going to work—corresponding question Q: are you going to work?

First intention: the user 600 needs a taxi—corresponding question Q: do you need a taxi?

First intention: the user 600 wants the phone in silent mode—corresponding question Q: do you want the phone in silent mode?

First intention: the user 600 wants to set a wakeup call—corresponding question Q: do you want to set a wakeup call?

First intention: the user 600 wants to power on home heating warmer—corresponding question Q: do you want to power on home heating warmer?

First intention: the user 600 wants to power off home heating cooler—corresponding question Q: do you want to power off home heating warmer?

At step II in FIG. 6, the electronic device 100 provides the determined question to the user 600. The electronic device 100 can provide the question by outputting the question to the user 600 using an output user interface 120 known in the art. It is natural that the output format must be understandable by the user 600. Hence, output format should be in a form understandable by a human being. Non-limiting examples of output user interface are speakers, displays, and tactile means. In the case speech is used a speech synthesizer can be used to produce the question in the form of speech to the user 600.

At step III in FIG. 6, the user 600 upon reception of the question gives a response to the question provided by the electronic device 100. In the case the question is a closed-end question the response to the closed-end question is given by the user 600 in the affirmative or negative. In non-limiting examples the user 600 can e.g. say "yes" (affirmative) or "no" (negative) in a microphone, nod (affirmative) or shake (negative) its head in front of a camera, touch a yes button (affirmative) or a no button (negative) on a touch screen, touch a physical yes button (affirmative) or a physical no button (negative), etc.

At step IV in FIG. 6, the user 600 provides the response to the electronic device 100. The response can be provided by using an input user interface 122 known in the art. Hence, the electronic device 100 detects an input of the user 600 by means of an input user interface 122. The input is thereafter translated into a machine format understandable by the electronic device 100. Thereby, the input of the user 600 is translated to the response to the question.

Non-limiting examples of input user interfaces are microphones, cameras, displays, and tactile means. In the case when speech is used by the user 600 speech recognition can be done by a speech recognition engine comprised in the electronic device 100. In an embodiment, questions and corresponding replies are fed into a learning system which over time understands the actions and needs of the user 600 so that the electronic device 100 can improve the predictions.

At step V in FIG. 6, the electronic device 100 upon reception of the response to the question predicts a second intention of the user 600 based on the first predicted intention and the response from the user 600. There are generally two main cases which will be described in the following.

In a first case a single first intention of the user 600 has been predicted by the electronic device 100 in step I. This means that the second intention of the user 600 will be equal to the single first intention of the user 600 if the response to the question is affirmative. If the response is negative a new first intention has to be determined by the electronic device 100.

In a second case a plurality of first intentions of the user 600 has been predicted by the electronic device 100 in step I. This means that the second intention of the user 600 can be equal to a single first intention of the user 600 among the plurality of first intentions of the user 600 depending on the response from the user 600. That the second intention is equal to a first intention is determined based on the first predicted intention, the response to the question and the question itself. For correct matching a sequence of questions may be provided to the user. For each response one or more first intentions can be discarded. Hence, an interactive algorithm can be used for finding the correct second intention.

At step VI in FIG. 6, the electronic device 100 according to an embodiment determines a suggested action and/or suggested information based on the second predicted intention of the user 600.

At step VII in FIG. 6, the electronic device 100 provides the suggested action and/or the suggested information to the user 600. In this respect the previously mentioned output user interfaces 120 can be used.

In the following disclosure the context information associated with the user 600 will be described more in detail. Further, aspects of how the first and second intentions of the user 600 is predicted based on said context information associated with the user 600 is further elaborated.

The electronic device 100 makes predictions about what the user 600 might want to do next, i.e. predicts an intention of the user 600. Human behaviour can often be divided to frequent actions/tasks, periodic actions and random actions. Therefore, human behaviour is never fully predictable and there is a need to ask one or more questions from the user 600 to be sure what the intention of the user 600 is. Otherwise the user 600 may be given wrong information or wrong actions may be performed by an application, such as a virtual assistant, which can make the user 600 annoyed. Hence, human behaviour is not predictable and error rate will be high and there will be multiple predicted intentions and more than one of the intentions can be a potential intention, but the user 600 picks just one.

Additionally, when context information of the user 600 is used in a prediction and the more backwards the context information is, more potential prediction branches will be the result. Because the available prediction branch on every step backwards and just few steps backwards may result in thousands of predictions, and only one matches the intention of the user 600. Therefore, it is important for the electronic device 100 to not only make educated guesses as predictions, but also catch up with the user 600 by asking questions. For example, a human secretary for a vice president in a company cannot read the mind of his or her manager. Hence, to arrange a schedule of the vice president, questions need to be asked in addition to being familiar of the vice president's interest, typical preferences, doings etc. Similarly, the electronic device 100 can function like an artificial secretary and therefore should know the doings, comings, goings, schedules, etc. of the user 600. However, like the human secretary, the electronic device 100 does not beforehand know the intention of the user 600. Therefore, when the electronic device 100 is unsure about the intention of the user 600, the electronic device 100 will ask a question to obtain better understanding of the actual intention of the user 600.

Conventional virtual assistants on the other hand are passive in the respect that they only react on questions formulated by the user 600 and does not work the other way around. Hence, the conventional virtual assistant often fails in providing the correct answer to the user 600, because understanding human language without understanding the context of the user 600 is hard if not impossible. Therefore, it is herein proposed to use context information associated with the user 600 to predict the intention of the user 600. An example of context information is given by the following set of words:

charger://connect
ringerMode://normal
flat://on
wifiNetwork://ssid/ThereGate_000547
timeOfDay://NOON
wifiNetwork://ssid/testi
timezone://EET
appNavigated://com.android.settings/com.android.settings.UsbSettings
wifiNetwork://ssid/AndroidAPks
wifiNetwork://ssid/HWFBCPE
wifiNetwork://ssid/AndroidAP
appNavigated://com.android.settings/com.android.settings.Settings$DevelopmentSett ingsActivity
timestamp://2013-08-20T12:14:17
timestamp://2013-08-20T12:14:16
wifiNetwork://ssid/KallenGate
dayOfWeek://TUESDAY
wifiNetwork://ssid/sipulinet
month://August
wifiNetwork://ssid/jmkn4
wifiNetwork://ssid/Mobile Pirates
wifi://connected/AndroidAPks
appStarted://com.android.settings/null
wifiNetwork://ssid/helsinkidemo
wifiNetwork://ssid/matetuuba
utc://2013-08-20T09:14:17
utc://2013-08-20T09:14:16
wifiNetwork://ssid/ThereGate_000297
charger://connected
wifiNetwork://ssid/wlanaccessv2.0
wifiNetwork://ssid/everest
wifiNetwork://ssidNogueAp
wifiNetwork://ssid/There_Guest
network://Saunalahti The data structures holding the sparse vectors can be in the memory in an index value format. They can be also stored as normal dense arrays like dense vectors are stored, but in this way the memory consumption will be higher as each vector will store all its indexes. There is a trade-off between computational efficiency and the memory consumption. The dense array can be faster to compute especially if computed with GPU, vs the data structure that relies on map data structure, to produce the index value—pairs, but when vectors are sparse and not dense (saturated), the index value pairs consume less memory and are also faster to iterate when they are sparse (i.e. few indexes occupied of e.g. 10000 space instead of all indexes occupied with a number). The data structure that holds the random index matrix is the following: Index value pair between word and corresponding vector where the vector is index value pair between vector index and the value. An example vector: 23,−65 614,64 1570,64 1976,−64 2295,−65 2301,64 2893,−64 3307,65 3501,−64 3554,−64 3577,64 3590,64 3774,−64 4815,64 5042,−64 5954,64 6187,64 6443,−64 7795,64 7858,−64.

Context information associated with the user 600 can be spatial context information and temporal context information. Spatial context information relates to what is around the user 600. Examples of spatial context information are: location, time, sensor input microphone, camera, ambient light sensor, proximity sensor, sensor hub movement classification: still, walking, running, in car, in bus, in train etc.

The spatial context information can be used to predict periodic occurrences of actions of the user 600. For example, if the user 600 goes to movie theatre and turns phone to silent every time in that location, the electronic device 100 will be known after a while that the user 600 wants the phone silent in that location. However, indoor navigation is often not accurate and the position, e.g. in a shopping mall, is not known accurately. Therefore, the location for the electronic device 100 can be understood to be the same regardless of the user is in the supermarket or in the movie theatre. Therefore, the electronic device 100 does not know for sure if the phone needs to be set to silent mode. Because if the electronic device 100 automatically turns the phone to silent mode without asking the user 600, it will be highly annoying to the user 600 when the user 600 is in the supermarket because the electronic device 100 has predicted that the user 600 went to the movie theatre that is inside the same building and in same zone as the supermarket. It will therefore be important to provide the question to the user 600 whether the user 600 wants the phone to be turned silent before commencing with it.

Temporal context information relates what happened before the current time instance, popularly denoted "now". The temporal context is a sequence of activities that form tasks. For example, in order to call a veterinary the user 600 goes to web page with browser, copies the phone number, pastes it to phone and makes a call. This is a sequence of tasks where the sequential temporal context of the call is the browser, and hence presenting the browser and copying the phone number will lead to the prediction that the user 600 will make a call.

There is also context information in the form of the frequency in things the user 600 performs which do not have particular time or particular place in a sequence, but are just randomly occurring frequent tasks. The frequency component is used in the prediction and this increases the quality of the prediction. Hence, there will typically be multiple potential things the user 600 might do next and the idea is that the electronic device 100 provides a question to the user 600 in a most minimal way possible to obtain information about the user 600 that can be used for making predictions.

The electronic device 100 may ask for the name of the place because the electronic device 100 may not have information about the place. Therefore, the electronic device 100 might ask that "what place is this?". The user 600 could e.g. answer "movie theatre", and the electronic device 100 will know that the user 600 is in a movie theatre and hence turns the phone into silent mode. Or the user 600 might answer "shopping" and the electronic device 100 knows that when the user 600 is shopping the silent mode of the phone is not turned on. The place can be associated with a zone identity (ID) to be used in zone management so as to track the location of the user 600. In zone management the world is quantized into zones. Each location is divided into a zone with a unique zone ID. Zones can be grid based or dynamically created. A path detector tracks paths the user 600 takes in zones. A zone manager handles path management in addition to zone management. The paths can be generated from maps from locations travelled and the zones. Locations between places are tracked as paths. These locations can be stored in a database. Anomaly detector for paths (tracks when user deviates from a known path). Location tracker that notices a normal path being activated, but a deviation happening. This could cause initiation of the electronic device 100 to inquire where the user 600 is going.

The electronic device 100 uses predictions to predict the potential actions (such as performing a task) and future spatial context (such as place) of the user 600. One way to predict the intention of the user 600 is by using a so called random indexing method together with context information. Hence, according to an embodiment the following is performed in the case more than one first intention of the user 600 has been predicted:

1. The predictions are made using a random index matrix to determine the first intention of the user 600.
2. The predictions are made to the random index matrix to determine the future spatial context.
3. The prediction is made by measuring the cosine distance of current event vector, i.e. the sum of vectors of the prevailing context, to all of the vectors of the random index matrix. There is a word that corresponds with each row of the random index matrix. There can be many thousands of columns in the vectors of the random index matrix. The columns are representation of the context that predicts a word that corresponds to the row. Each row is a vector that predicts the word corresponding to the row.
4. When a prediction is made, the best matching rows compared to the current context vector, are picked and added to an ordered list that is ordered by the cosine similarity of the row.
5. Often there are a plurality of possible predictions, but only that prediction is correct, which matches the intention of the user 600. In the case of a plurality of first intentions predicted:
    I. The best predictions are taken and formatted into question with e.g. natural language generation. The question is then e.g. auditioned to the user 600 via speech synthesis.
    II. The electronic device 100 waits for a response to the question once it has produced the question.
    III. The questions are generated in a simple language format, such as a closed question, e.g.:
        a. Predictor predicts that the potential future spatial context is "in bus" and also path from work to home is among best predictions.
        b. Natural language generation produces a question sentence "Are you going to the bus?"

c. User 600 answers "Yes".
d. If the electronic device 100 is unsure of the destination, it would ask a further question, but because it already has the prediction of the path from work to home, it does not need to ask a further question.
e. The electronic device 100 connects to a bus timetable service, obtains timetables for the route from the current address to the home address.
f. The electronic device 100 then memorises the bus route and advises the user 600 to take a specific bus and informs the user on how many minutes there is waiting time before the bus arrives.

The electronic device 100 joins or combines the context information together and produces context understanding and activity prediction and generates questions. The context information can be joined or combined together by summing multiple sparse vectors representing context information together. The combination of the vectors as single vector is the collection of the spatial context information. Example of summing sparse vectors:

Vector 1: 00000010000000010101
0000000000000000110000000000001100000
Vector 2: 100010000000000000100000
000010000000000000010000000000
Vector N: 000000000000000100000000000
00000100000000100000000000000
Sum vector: 100010100000000201020000
0000010010001100001000010001100000

The sparse vectors can be summed together without ill-effects despite collisions between indexes may happen, because one "thing" is represented by 20 indexes in a 10000- (or bigger) space and the vector distance, despite of collisions, between two "things" is astronomically large.

The combined sum vector is the context vector that is used for the prediction and learning of the event. This vector can be fed as an input to a neural network system, or it can be used with the previous mentioned random indexing algorithm which gives lower accuracy but much lower complexity in computation. Using random indexing for predictions can be described as follows:

The context information is converted into uri-encoded words. For example a GPS location becomes a zone id by zone manager, for example zone://_37_140951_76690. A time of 12:38:47 would become: hour://12 minute://30. An activity would become for example appActivity://com.huawei.musicplayer/play/resume_playing or for example appLaunched://com.reittiopas.reittiopasApp.

The paths are also activities, and they are designated with path-id. The zone manager will keep track of paths and assign a path id to often occurring paths. The path will predict the destination zone.

The context information and activities that are represented as uri-encoded words, are collected together to form a bag of words.

The bag of words is turned into sparse vectors the following way:

Each word in the bag of words is assigned a unique ID for that word sparse vector.

Each event (bag of words) is identified by additional vector which helps tracing back the bag of words to an event.

A vocabulary of words to sparse vectors is built and the old mappings between the words and the sparse vectors are used when these are already in existence in the vocabulary.

Each sparse vector is randomly generated by using random set of indexes between 0 and 10000 (or N, depending what is the length of the vector). Each word is represented by 20 indexes which were randomly selected. The system is a random hashing system.

The sparse vectors are then used for prediction with random index and as an input and output of artificial neural networks that are used to accomplish the reasoning.

The event is also online learned by the electronic device 100. The event vector that was produced in the above-mentioned fashion, is added to all rows on the matrix that represent the words in the bag of words that the event vector was generated from.

The learning is done by simple vector add. The learning algorithm can follow any conventional algorithm.

The above mentioned cosine similarity is a measure of similarity between two non-zero vectors of an inner product space that measures the cosine of the angle between them. The cosine of 0 is 1, and it is less than 1 for any other angle. It is thus a judgment of orientation and not magnitude: two vectors with the same orientation have a cosine similarity of 1, two vectors at 90 have a similarity of 0, and two vectors diametrically opposed have a similarity of −1, independent of their magnitude. Cosine similarity is particularly used in positive space, where the outcome is neatly bounded in [0,1]. In this case, unit vectors are maximally "similar" if they're parallel and maximally "dissimilar" if they're orthogonal, i.e. perpendicular. This is analogous to cosine, which is unity (maximum value) when the segments subtend a zero angle and zero (uncorrelated) when the segments are perpendicular.

Figure 7:
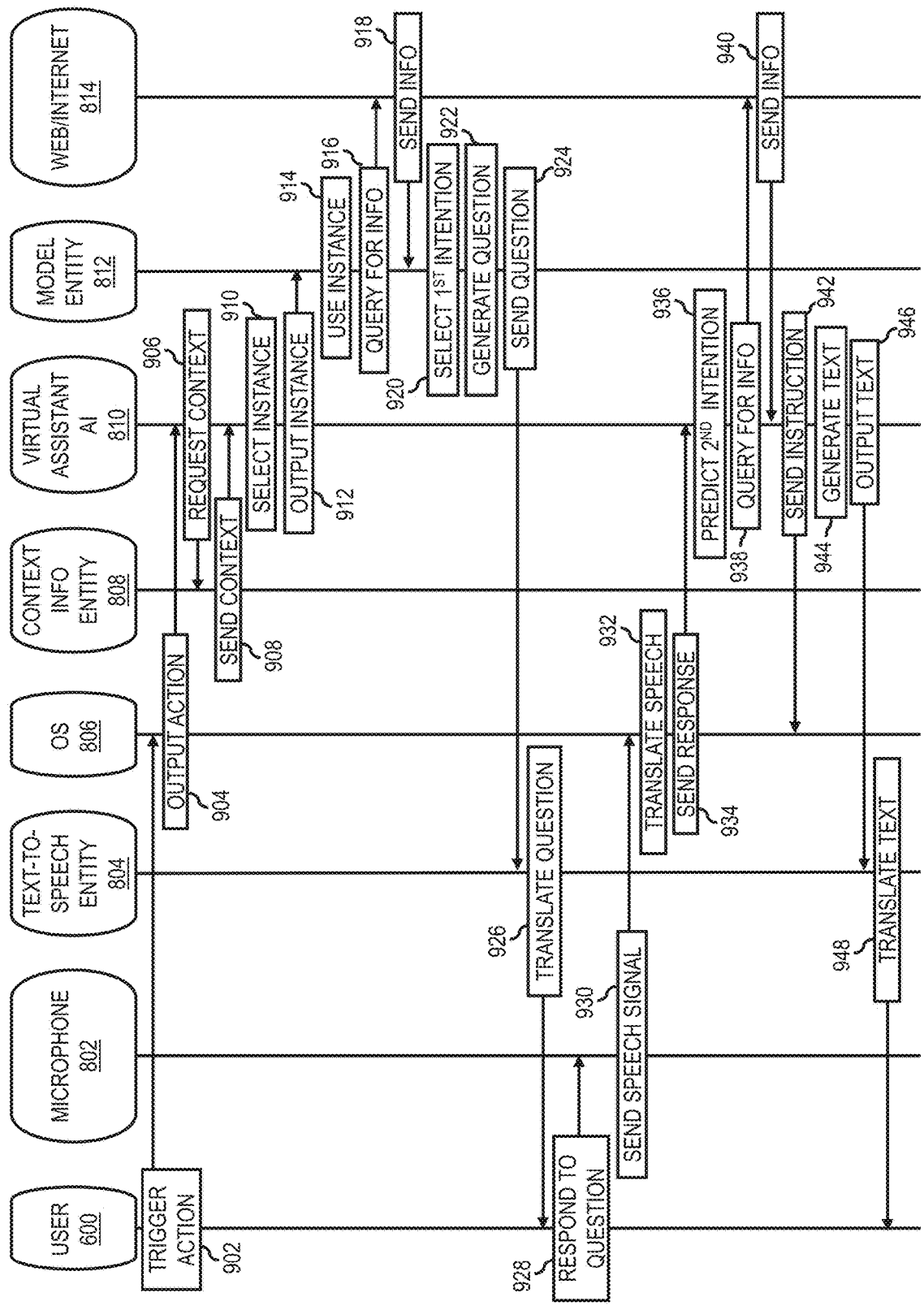
FIG. 7 shows a diagram of an embodiment.

FIG. 7 shows a diagram of a further embodiment. The blocks in FIG. 7 illustrates: user 600, microphone 802, text-to-speech entity 804, operating system (OS) 806, context information entity 808, virtual assistant artificial intelligence (AI) 810, model entity 812, and the web/internet 814. The following steps are performed in FIG. 7:

902: the user 600 performs a trigger action that is detected by the OS 806. The action can be detected by e.g. the use of suitable sensors known in the art.

904: the action triggers the OS 806 to output the detected action to the virtual assistant AI 810.

906: the assistant AI 810 requests context information related to the detected action from the context information entity 808.

908: the context information entity 808 sends context information related to the detected action to the assistant AI 810 in response to the request. This can e.g. relate to time information, spatial information and previous actions.

910: the assistant AI 810 selects one or more instances of said context information and actions.

912: the assistant AI 810 outputs the selected one or more instances of said context information and actions to the model entity 812.

914: the model entity 812 uses the selected one or more instances of said context information and actions for determining a plurality of first intentions of the user 600.

916: the model entity 812 queries the web/internet for information about one or more first intentions. Also, internal data bases can be queried in this respect.

918: the model entity 812 receives information from the web/internet about the plurality of first intentions.

920: the model entity 812 selects one first intention among the plurality of first intentions based on the information the web/internet and context information.
922: the model entity 812 generates a question based on selected first intention.
924: the question in machine format is sent to the text-to-speech entity 804.
926: the text-to-speech entity 804 translates the question from machine format to speech which is presented to the user 600.
928: the user 600 responds to the question in speech in the microphone 802.
930: the speech signal is sent to the OS 806 for processing.
932: OS 806 translates the speech in the speech signal into machine format and/or text format. The latter can be presented to the user 600.
934: the text format of the response to the question is sent to the assistant AI 810.
936: the assistant AI 810 predicts a second intention of the user based on the response in text format and the selected first intention of the user 600. The second intention can e.g. be an action and/or information to be provided to the user 600.
938: the assistant AI 810 queries the web/internet about information related to the predicted second intention.
940: the assistant AI 810 gets response from the web/internet about information related to the second intention.
942: the assistant AI 810 sends an instruction to the OS 806 if an action is to the performed, e.g. "start music player", "play music", etc.
944: if information should be presented, the virtual assistant AI 810 generates information in text format.
946: the virtual assistant AI 810 outputs the information in text format to the text-to-speech entity 804.
948: the text-to-speech entity 804 translates the information in text format to speech and provides the speech to the user 600.

To provide even deeper understanding four exemplary embodiments illustrating the question-response algorithm are herein presented.

Example 1

It is Tuesday evening and the user 600 is walking towards the bus stop of Ruoholahti, Finland. From previous experience it can be predicted that a user 600 might be getting into bus and might be interested in bus time tables. However, this time the user 600 is not going to the bus, but instead waiting for a taxi-ride from the bus stop. The interaction between the electronic device 100 and the user 600 go as follows:

The electronic device 100 predicts that the user is not sure whether he will take the bus.
The electronic device 100 provides a question to the user 600 by speech synthesis: Are you going to bus? The electronic device 100 provides the question because the electronic device 100 does not know the answer and would give misleading information if it relied on the prediction.
The user 600 responds to the question: No.
The electronic device 100 concludes that the user 600 is not going by bus and therefore does not offer a bus time table to the user 600.

Example 2

It is Tuesday evening and the user 600 is walking towards the bus stop of Ruoholahti, Finland. From previous experience and context information the electronic device 100 predicts that the user 600 might take the bus and might be interested in bus time tables. However, this is not always the case and the electronic device 100 is not sure. However, this time the user 600 is indeed going to take the bus. The interaction between the electronic device 100 and the user 600 goes on as follows:

The electronic device 100 does a prediction that the user 600 will go with the bus as the likely next action of the user 600.
The electronic device 100 provides a question to the user 600 by speech synthesis: Are you going to the bus?
The user 600 responds to the question: Yes.
The electronic device 100 predicts that user 600 is heading towards home when going to this particular bus stop at this time and presents information to the user 600 in a display or as speech: Bus 160K will arrive at the bus stop in one minute from now, please hurry if you are going to catch it.

Example 3

The user 600 drives through Helsinki but deviates from the normal route and drives to streets the user 600 has never driven before. The electronic device 100 notices anomaly in the driving pattern and uses its associative memory of the travelled normal paths to compare current path with the old paths. The interaction between the electronic device 100 and the user 600 goes as follows:

The electronic device 100 notices anomaly in the driving pattern of the user 600.
The electronic device 100 provides a question to the user 600 by speech synthesis: Are you lost?
The user 600 responds to the question: Yes.
The electronic device 100 provides a new question to the user 600 based on the response by speech synthesis: Do you need help getting back to your known routes?
The user 600 responds to the question: Yes.
The electronic device 100 therefore knows that user 600 is lost and the detour is not intentional. The electronic device 100 uses a GPS program and gives the nearest location in the known path as the destination point and starts the navigation with the navigation program.
The user 600 gets instructions from the navigation program and gets back to the familiar path.
The electronic device 100 knows the task is completed when the user 600 is back on the known path.

Example 4

The user 600 named Harri is driving through Espoo and is coming back from work. The user 600 receives an urgent email from his boss "Harri, you forgot your wallet to the office, can you turn back to come get it, I will come to the door to hand it over to you. Please call me!". The electronic device 100 notices the email, and also notices that the email is sent from Harri's boss. The interaction between the electronic device 100 and the user 600 goes on as follows:

The electronic device 100 informs the user 600 Harri that his boss has sent him an email and asks the user 600: Do you want to have the email read?
The user 600 responds to the question: Yes.
The electronic device 100 reads the email to the user 600 using speech synthesis by accessing email database and obtaining the text contents of the email and then sending the email to a text-to-speech engine.

The electronic device 100 notices with high confidence, from the email text that the sender context is Harri's boss and that the boss wants Harri to call him/her.

The electronic device 100 finds the phone number to the boss from an address book of the user 600.

The electronic device 100 asks the user 600: Do you want to call the boss?

The user 600 responds to the question: Yes.

The electronic device 100 calls the phone number to the boss obtained from the address book.

The user 600 Harri has a call with his boss and thereafter drives directly to the front of the office as agreed and gets the forgotten wallet from his boss.

As previously mentioned the electronic device 100 can according to embodiments be comprised in a client device 300. The client device 300 herein, may be denoted as a user device, a User Equipment (UE), a mobile station, an internet of things (IoT) device, a sensor device, a wireless terminal and/or a mobile terminal, is enabled to communicate wirelessly in a wireless communication system, sometimes also referred to as a cellular radio system. The UEs may further be referred to as mobile telephones, cellular telephones, computer tablets or laptops with wireless capability. The UEs in this context may be, for example, portable, pocket-storable, hand-held, computer-comprised, or vehicle-mounted mobile devices, enabled to communicate voice and/or data, via the radio access network, with another entity, such as another receiver or a server. The UE can be a Station (STA), which is any device that contains an IEEE 802.11-conformant Media Access Control (MAC) and Physical Layer (PHY) interface to the Wireless Medium (WM). The UE may also be configured for communication in 3GPP related LTE and LTE-Advanced, in WiMAX and its evolution, and in fifth generation wireless technologies, such as New Radio.

The network access node 400 herein may also be denoted as a radio network access node, an access network access node, an access point, or a base station, e.g. a Radio Base Station (RBS), which in some networks may be referred to as transmitter, "gNB", "gNodeB", "eNB", "eNodeB", "NodeB" or "B node", depending on the technology and terminology used. The radio network access nodes may be of different classes such as e.g. macro eNodeB, home eNodeB or pico base station, based on transmission power and thereby also cell size. The radio network access node can be a Station (STA), which is any device that contains an IEEE 802.11-conformant Media Access Control (MAC) and Physical Layer (PHY) interface to the Wireless Medium (WM). The radio network access node may also be a base station corresponding to the fifth generation (5G) wireless systems.

Furthermore, any method according to one or more embodiments may be implemented in a computer program, having code means, which when run by processing means causes the processing means to execute the steps of the method. The computer program is included in a computer readable medium of a computer program product. The computer readable medium may comprise essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that embodiments of the client device 300 and the network access node 400 comprises the necessary communication capabilities in the form of e.g., functions, means, units, elements, etc., for performing the solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the solution.

Especially, the processor(s) of the electronic device 100 and the network access node 300 may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the present disclosure is not limited to the embodiments described above, but also relates to and incorporates all embodiments within the scope of the appended independent claims.

The invention claimed is:

1. An electronic device for predicting an intention of a user, the electronic device being configured to:
   predict at least one first intention of the user based on context information associated with the user;
   determine a question based on the at least one first intention of the user;
   provide the question to the user;
   receive a response to the question from the user; and
   predict at least one second intention of the user based on the at least one first intention of the user and the response to the question from the user,
   wherein the device is configured to predict the at least one first intention of the user based on the context information associated with the user by:
   combining a plurality of sparse vectors corresponding to a plurality of context information associated with the user so as to obtain a combined sparse vector; and
   predicting the at least one first intention based on random indexing of the combined sparse vector.

2. The electronic device according to claim 1, configured to:
   determine a suggested action based on the at least one second intention of the user; and
   provide the suggested action to the user.

3. The electronic device according to claim 1, configured to:
   determine suggested information based on the at least one second intention of the user; and
   provide the suggested information to the user.

4. The electronic device according to claim 1, configured to:
   predict a single first intention of the user based on the context information associated with the user; and
   predict a single second intention of the user to be equal to the single first intention of the user.

5. The electronic device according to claim 1, configured to:
predict a plurality of first intentions of the user based on the context information associated with the user; and
predict a single second intention of the user to be equal to a single first intention of the user among the plurality of first intentions of the user.

6. The electronic device according to claim 1, wherein the question is a closed-end question.

7. The electronic device according to claim 6, wherein the response to the closed-end question is affirmative or negative.

8. The electronic device according to claim 1, wherein the context information associated with the user comprises temporal context information and spatial context information.

9. The electronic device according to claim 1, wherein the device is configured to determine the question based on the at least one first intention of the user by:
selecting the question among a plurality of pre-defined questions based on the at least one first intention of the user.

10. The electronic device according to claim 1, wherein the device is configured to provide the question to the user by:
outputting the question to the user using an output user interface.

11. The electronic device according to claim 1, wherein the device is configured to receive the response to the question from the user by:
detecting an input of the user using an input user interface; and
translating the input of the user into the response to the question.

12. The electronic device according to claim 1, wherein the at least one first intention of the user and the at least one second intention of the user are actions of the user or needs of the user.

13. A method for predicting an intention of a user, the method comprising:
predicting at least one first intention of the user based on context information associated with the user;
determining a question based on the at least one first intention of the user;
providing the question to the user;
receiving a response to the question from the user; and
predicting at least one second intention of the user based on the at least one first intention of the user and the response to the question from the user,
wherein the predicting the at least one first intention of the user based on the context information associated with the user comprises:
combining a plurality of sparse vectors corresponding to a plurality of context information associated with the user so as to obtain a combined sparse vector; and
predicting the at least one first intention based on random indexing of the combined sparse vector.

14. The method according to claim 13, further comprising:
determining a suggested action based on the at least one second intention of the user; and
providing the suggested action to the user.

15. The method according to claim 13, further comprising:
predicting a plurality of first intentions of the user based on the context information associated with the user; and
predicting a single second intention of the user to be equal to a single first intention of the user among the plurality of first intentions of the user.

16. A non-transitory computer readable storage medium, having executable instructions stored thereon that, when executed by at least one processor, cause an apparatus to:
predict at least one first intention of the user based on context information associated with the user, wherein to predict the at least one first intention of the user, the apparatus is caused to:
combine a plurality of sparse vectors corresponding to a plurality of context information associated with the user so as to obtain a combined sparse vector; and
predict the at least one first intention based on random indexing of the combined sparse vector;
determine a question based on the at least one first intention of the user;
provide the question to the user;
receive a response to the question from the user; and
predict at least one second intention of the user based on the at least one first intention of the user and the response to the question from the user.

17. The non-transitory computer readable storage medium of claim 16, wherein the apparatus is further caused to:
determine a suggested action based on the at least one second intention of the user; and
provide the suggested action to the user.

18. The non-transitory computer readable storage medium of claim 16, wherein the apparatus is further caused to:
determine suggested information based on the at least one second intention of the user; and
provide the suggested information to the user.

19. The non-transitory computer readable storage medium of claim 16, wherein the apparatus is further caused to:
predict a single first intention of the user based on context information associated with the user; and
predict the second intention of the user to be equal to the single first intention of the user.

20. The non-transitory computer readable storage medium of claim 16, wherein the apparatus is further caused to:
predict a plurality of first intentions of the user based on the context information associated with the user; and
predict a single second intention of the user to be equal to a single first intention of the user among the plurality of first intentions of the user.

* * * * *